Figure 1:
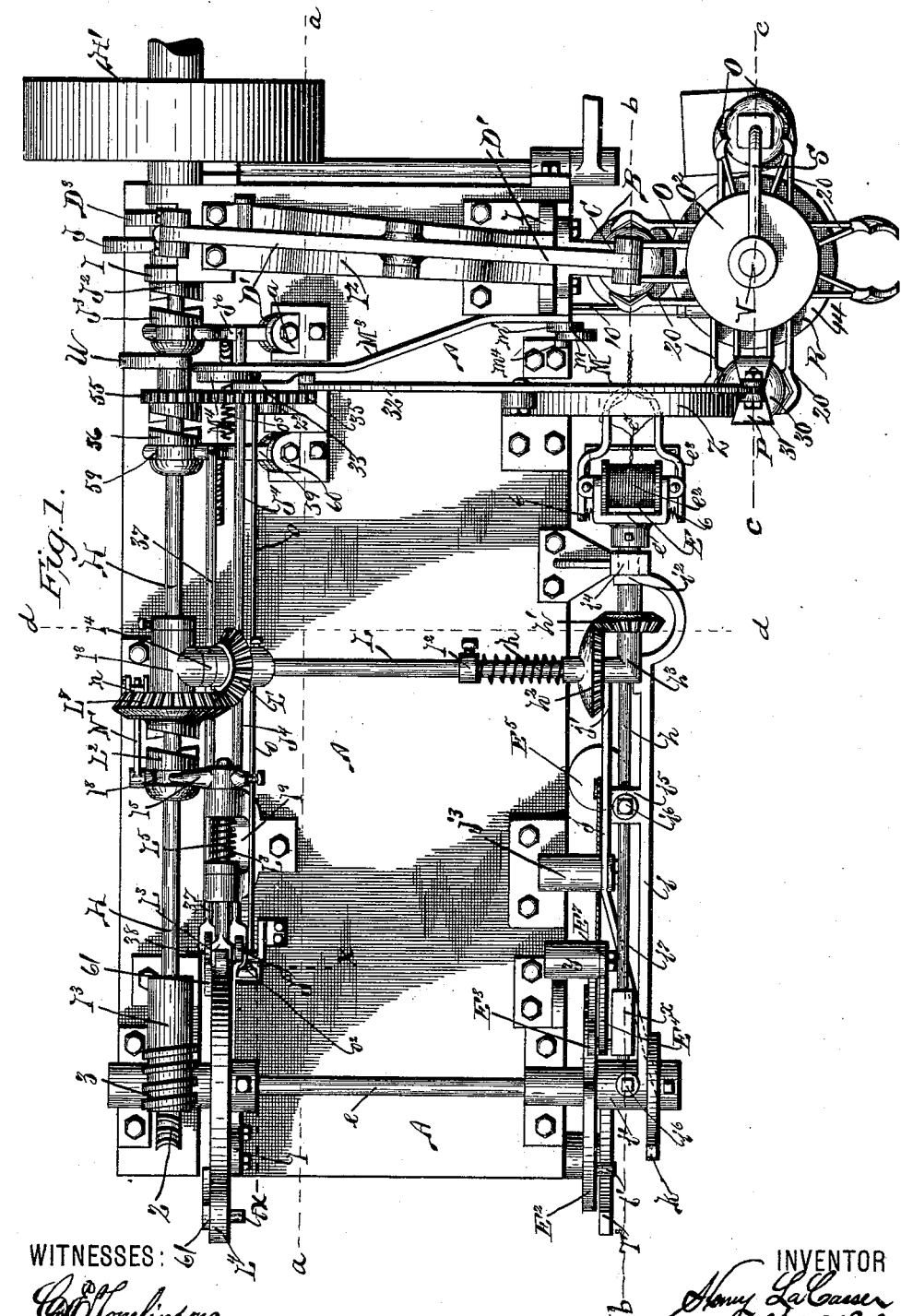

(No Model.) 11 Sheets—Sheet 1.
H. LA CASSE & S. WILE.
MACHINE FOR CORKING BOTTLES AND WIRING THE CORKS THERETO.
No. 406,450. Patented July 9, 1889.

WITNESSES:

INVENTOR
BY
ATTORNEY.

(No Model.) 11 Sheets—Sheet 2.
H. LA CASSE & S. WILE.
MACHINE FOR CORKING BOTTLES AND WIRING THE CORKS THERETO.
No. 406,450. Patented July 9, 1889.

WITNESSES:
INVENTORS
Henry LaCasse
Sol Wile
BY
George W. Hey
ATTORNEY (No Model.)

11 Sheets—Sheet 3.

H. LA CASSE & S. WILE.
MACHINE FOR CORKING BOTTLES AND WIRING THE CORKS THERETO.

No. 406,450. Patented July 9, 1889.

WITNESSES

INVENTOR

ATTORNEY (No Model.) 11 Sheets—Sheet 4.
H. LA CASSE & S. WILE.
MACHINE FOR CORKING BOTTLES AND WIRING THE CORKS THERETO.
No. 406,450. Patented July 9, 1889.
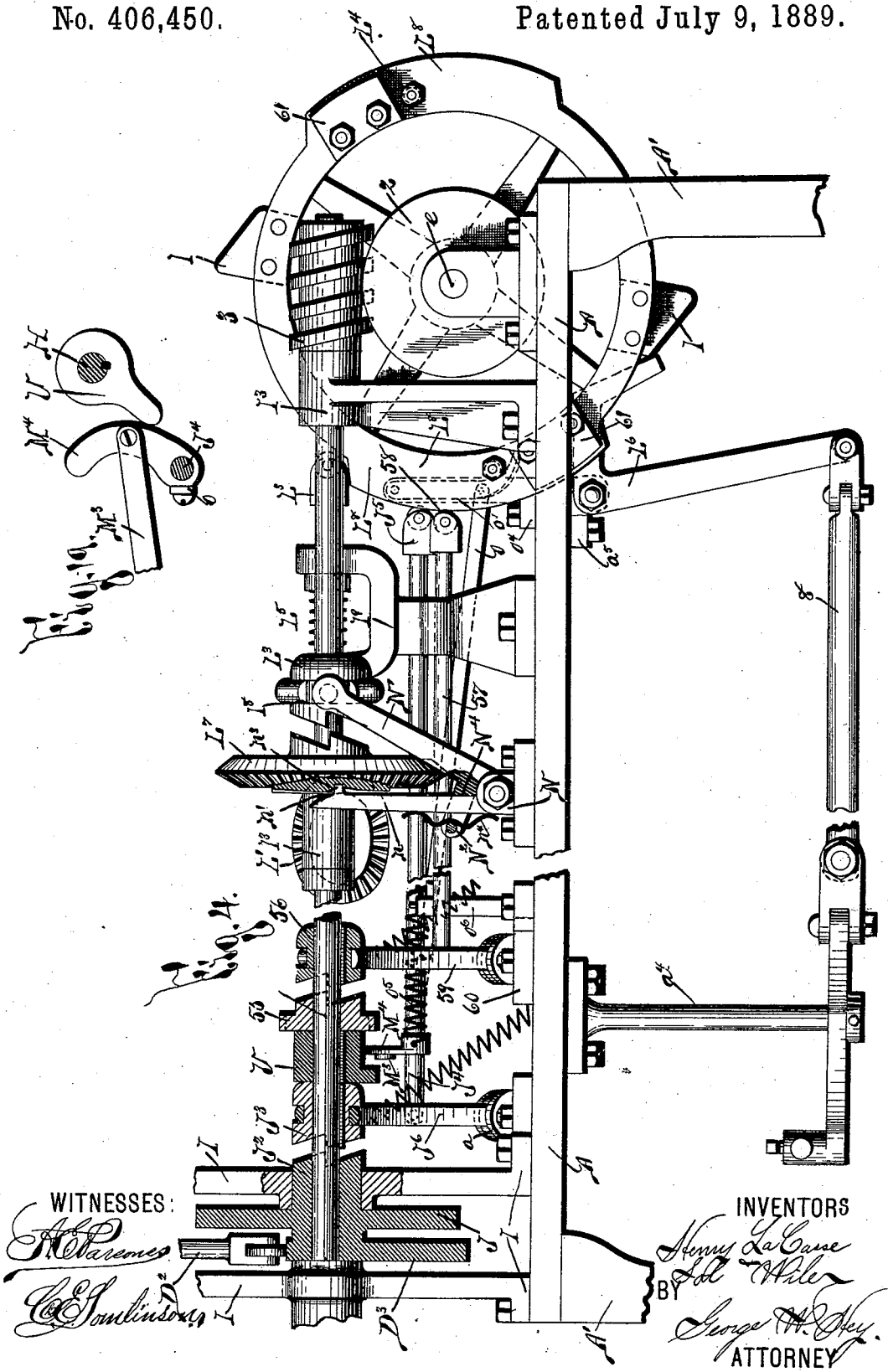
WITNESSES:
INVENTORS
BY
ATTORNEY (No Model.) 11 Sheets—Sheet 5.
H. LA CASSE & S. WILE.
MACHINE FOR CORKING BOTTLES AND WIRING THE CORKS THERETO.
No. 406,450. Patented July 9, 1889.
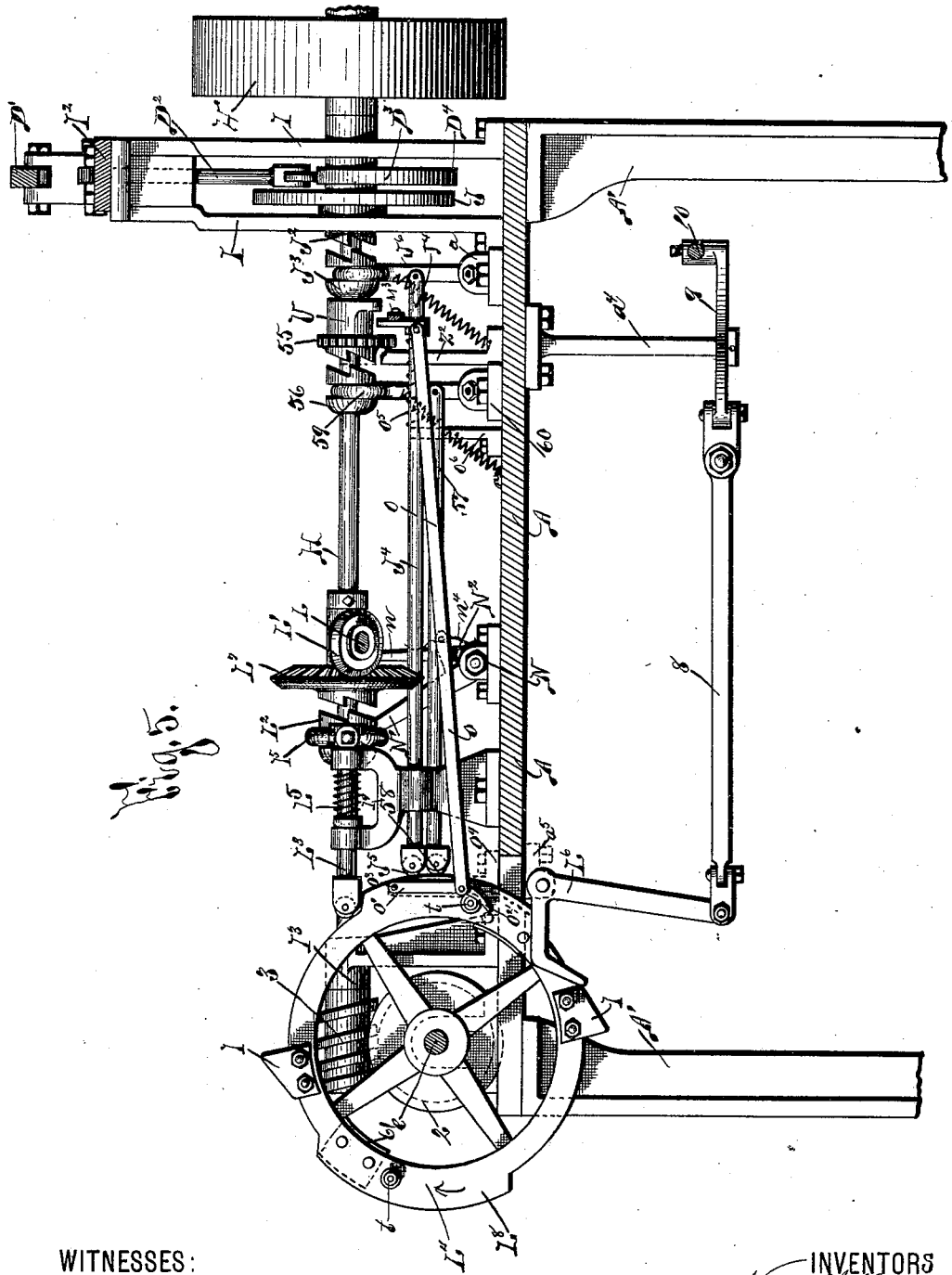
WITNESSES:
INVENTORS
BY
ATTORNEY.

(No Model.) 11 Sheets—Sheet 6.
H. LA CASSE & S. WILE.
MACHINE FOR CORKING BOTTLES AND WIRING THE CORKS THERETO.
No. 406,450. Patented July 9, 1889.
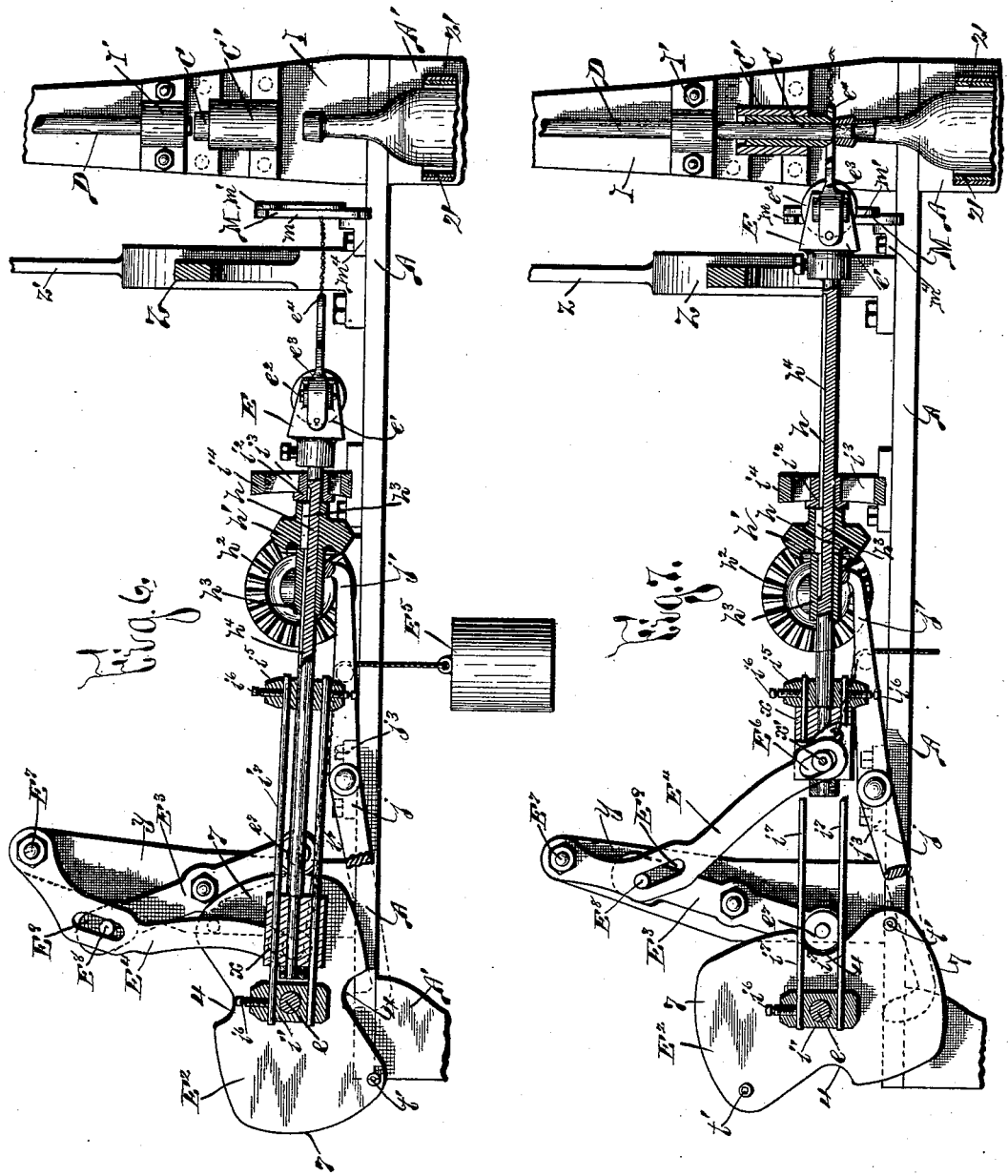
WITNESSES:
INVENTORS
BY
ATTORNEY

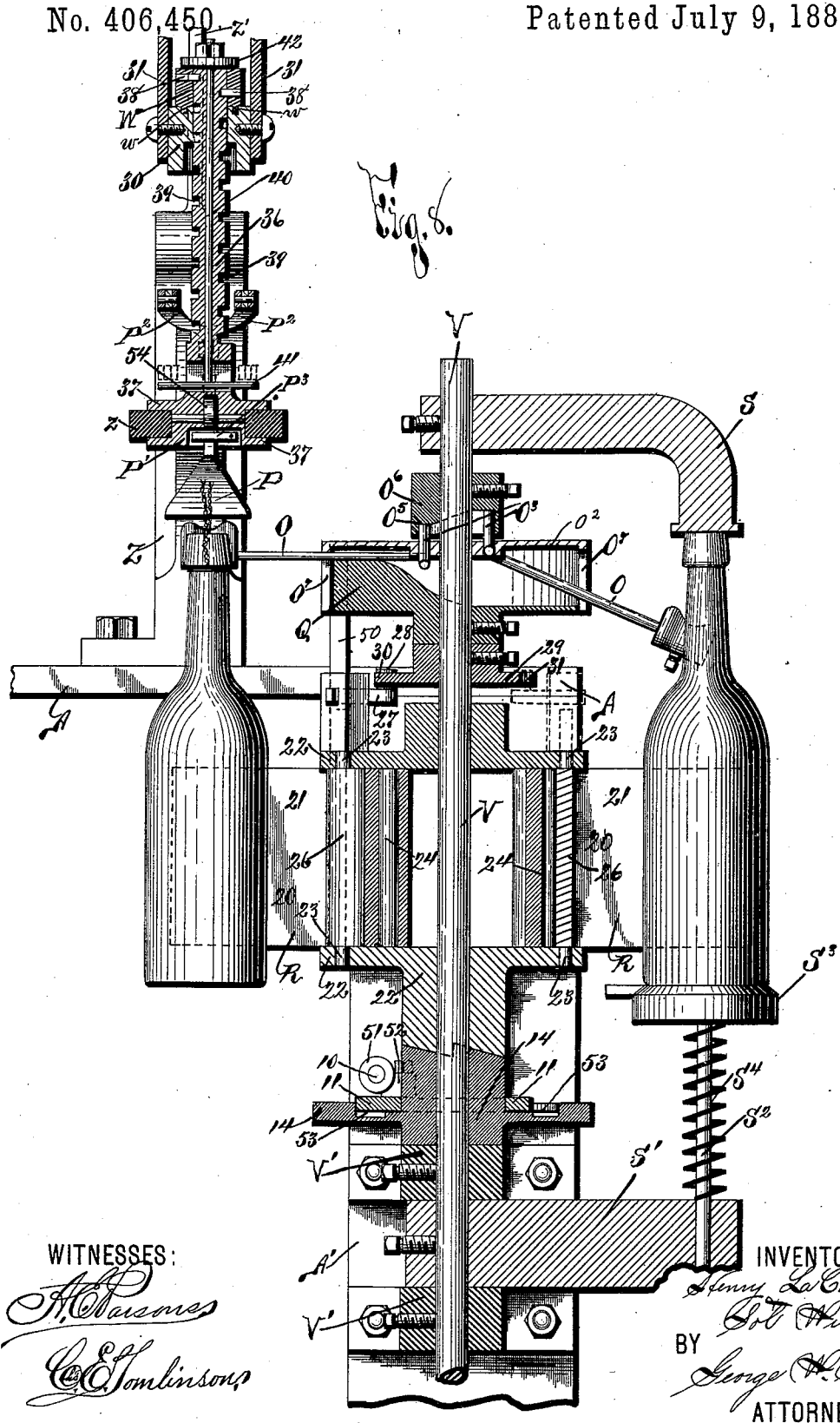

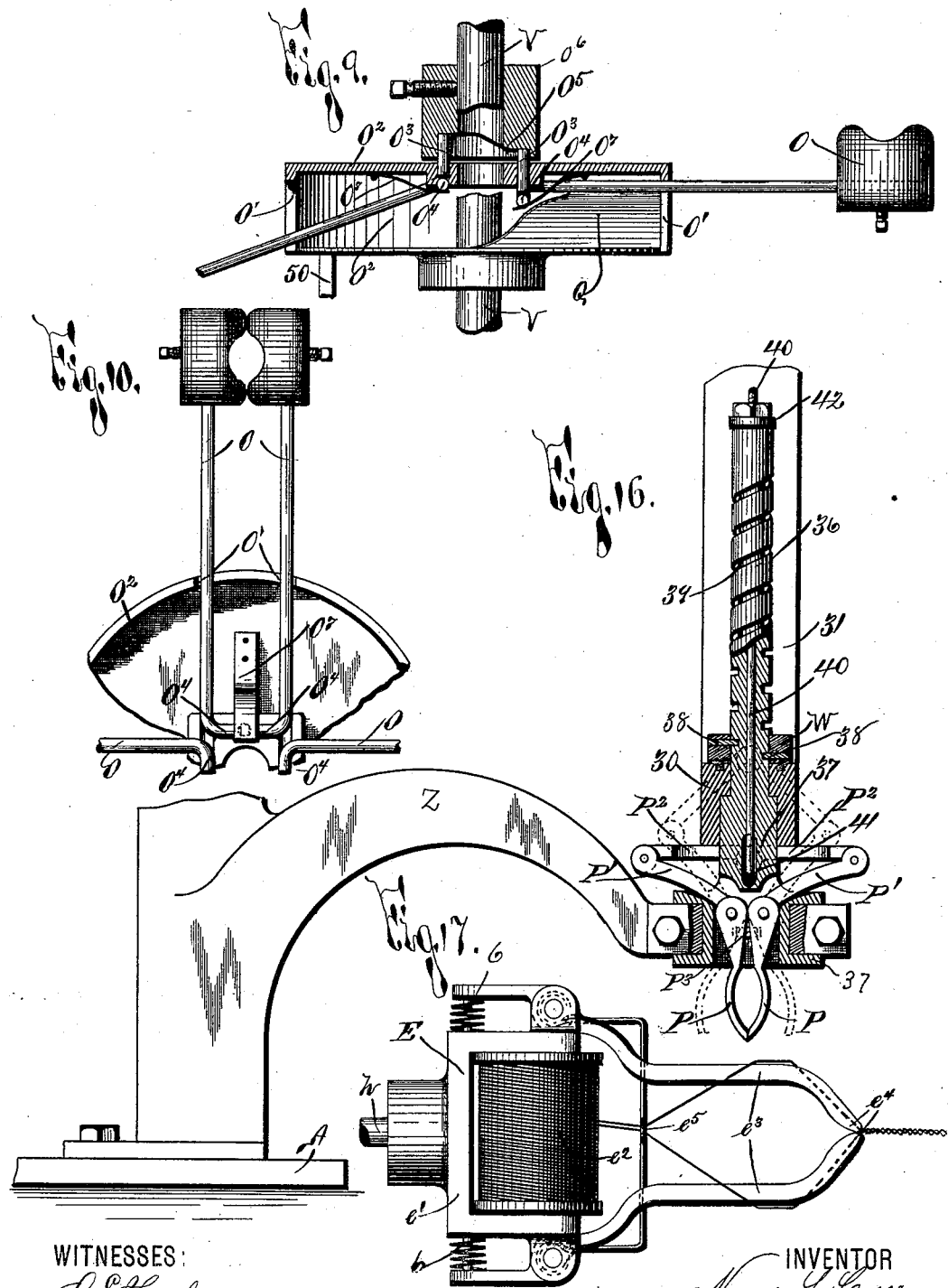

(No Model.) 11 Sheets—Sheet 9.
H. LA CASSE & S. WILE.
MACHINE FOR CORKING BOTTLES AND WIRING THE CORKS THERETO.
No. 406,450. Patented July 9, 1889.
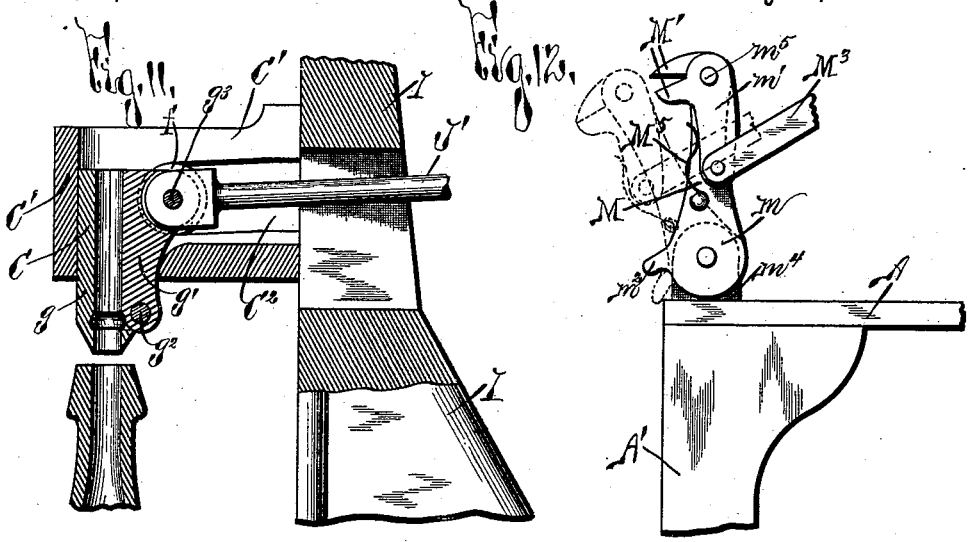
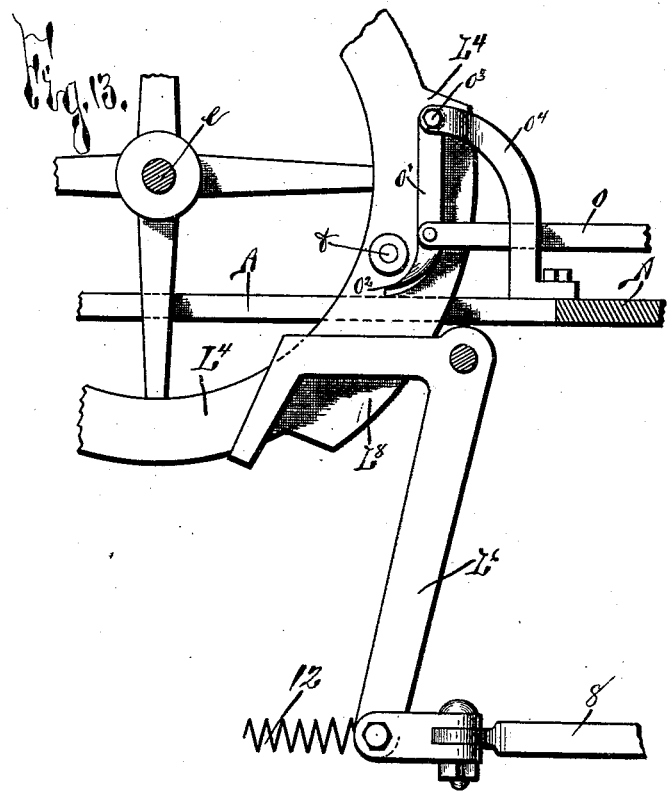
WITNESSES:
INVENTOR
Henry La Casse
Sol Wile
BY
George H. Hey
ATTORNEY (No Model.) 11 Sheets—Sheet 10.
H. LA CASSE & S. WILE.
MACHINE FOR CORKING BOTTLES AND WIRING THE CORKS THERETO.
No. 406,450. Patented July 9, 1889.
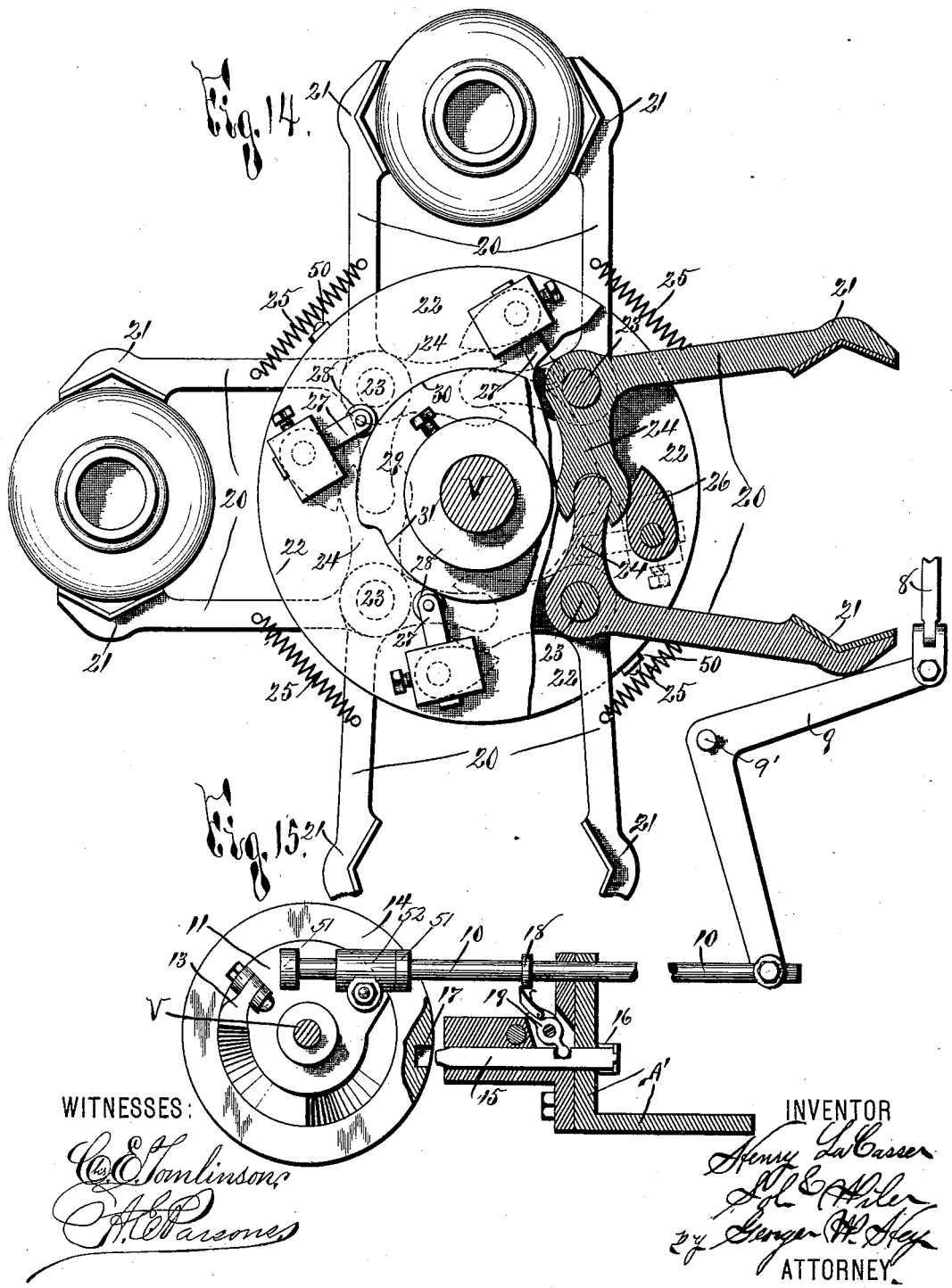

(No Model.) 11 Sheets—Sheet 11.
H. LA CASSE & S. WILE.
MACHINE FOR CORKING BOTTLES AND WIRING THE CORKS THERETO.

No. 406,450. Patented July 9, 1889.

WITNESSES:

INVENTORS
Henry La Casse
S. Wile
BY
George W. Hey
ATTORNEY

UNITED STATES PATENT OFFICE.

HENRY LA CASSE, OF SYRACUSE, AND SOL. WILE, OF ROCHESTER, NEW YORK; SAID LA CASSE ASSIGNOR TO SAID WILE.

MACHINE FOR CORKING BOTTLES AND WIRING THE CORKS THERETO.

SPECIFICATION forming part of Letters Patent No. 406,450, dated July 9, 1889.

Application filed November 24, 1888. Serial No. 291,772. (No model.)

*To all whom it may concern:*

Be it known that we, HENRY LA CASSE, of Syracuse, in the county of Onondaga, and SOL. WILE, of Rochester, in the county of Monroe, in the State of New York, have invented new and useful Improvements in Machines for Corking Bottles and Wiring the Corks Thereto, of which the following, taken in connection with the accompanying drawings, is a full, clear, and exact description.

Our invention relates to machines for corking bottles and wiring the corks thereto, and has for its object the production of a machine which shall insert the cork into the bottle and securely wire the cork to the bottle automatically and with great accuracy and rapidity of operation; and to this end it consists, essentially, in a compressor for compressing the cork, a support or other mechanism for supporting the bottle in proximity to the compressor and in the line of motion of the cork, a bottle-carrier for feeding the bottles, a plunger for inserting the cork at the proper time, a wire-carrier feeding out a desired portion of the wire and securing it to the bottle, a cut-off for severing the wire secured to the bottle from the wire-carrier when a suitable amount has been fed out, mechanism for turning the wire over the top or nose of the bottle across the inserted cork, and mechanism for securing the same in its desired position.

In specifying our invention reference is had to the accompanying drawings, forming a part of this specification, in which like letters indicate corresponding parts in all the views.

Figure 2:
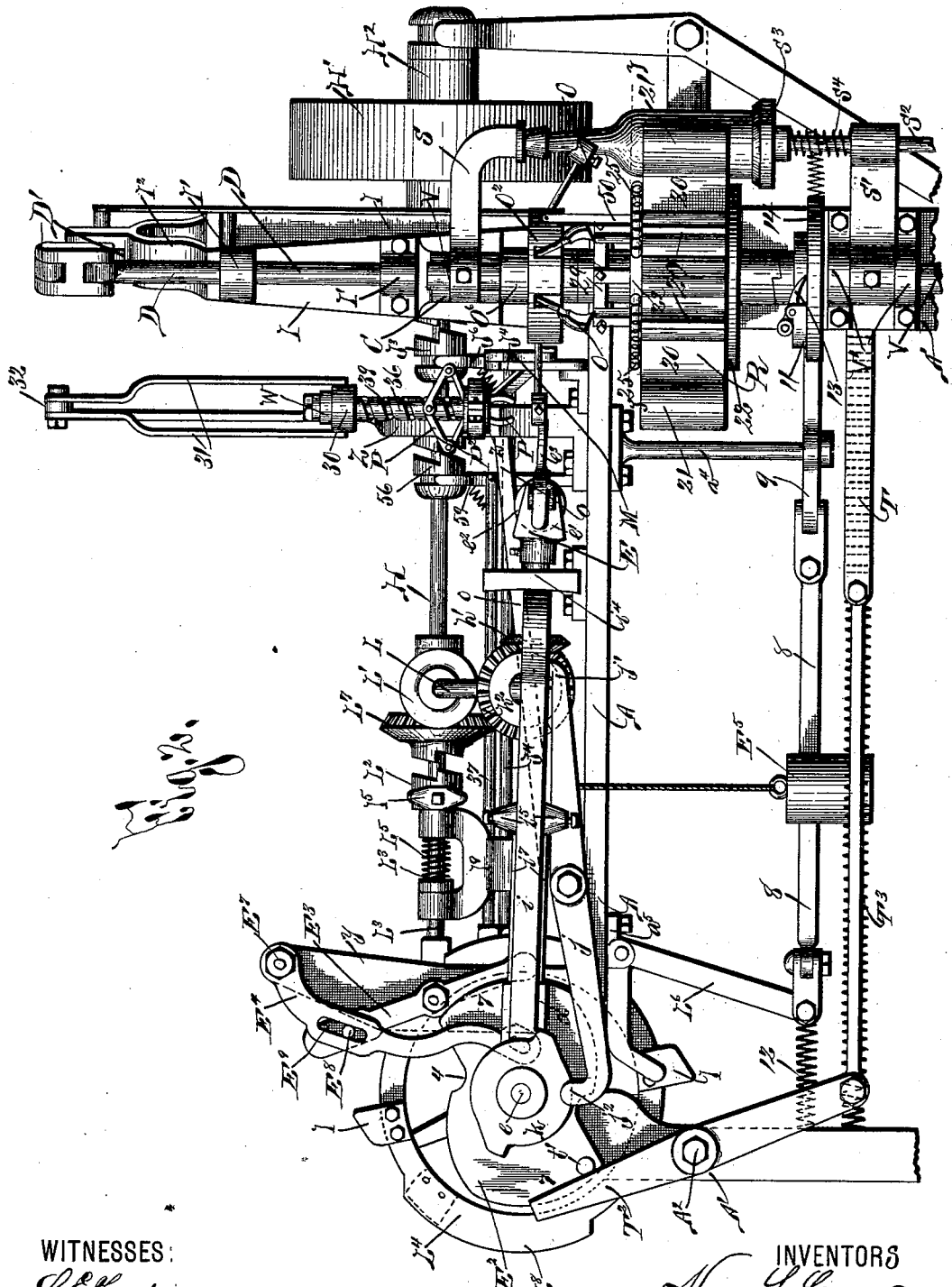
Figure 3:
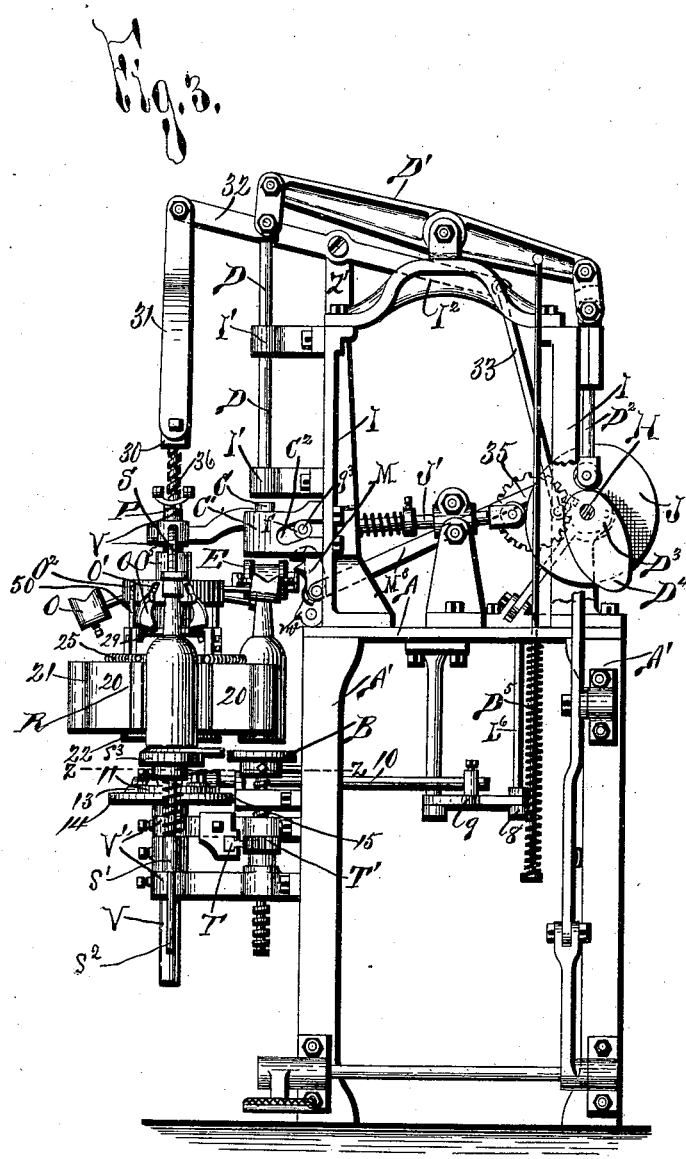
Figure 18:
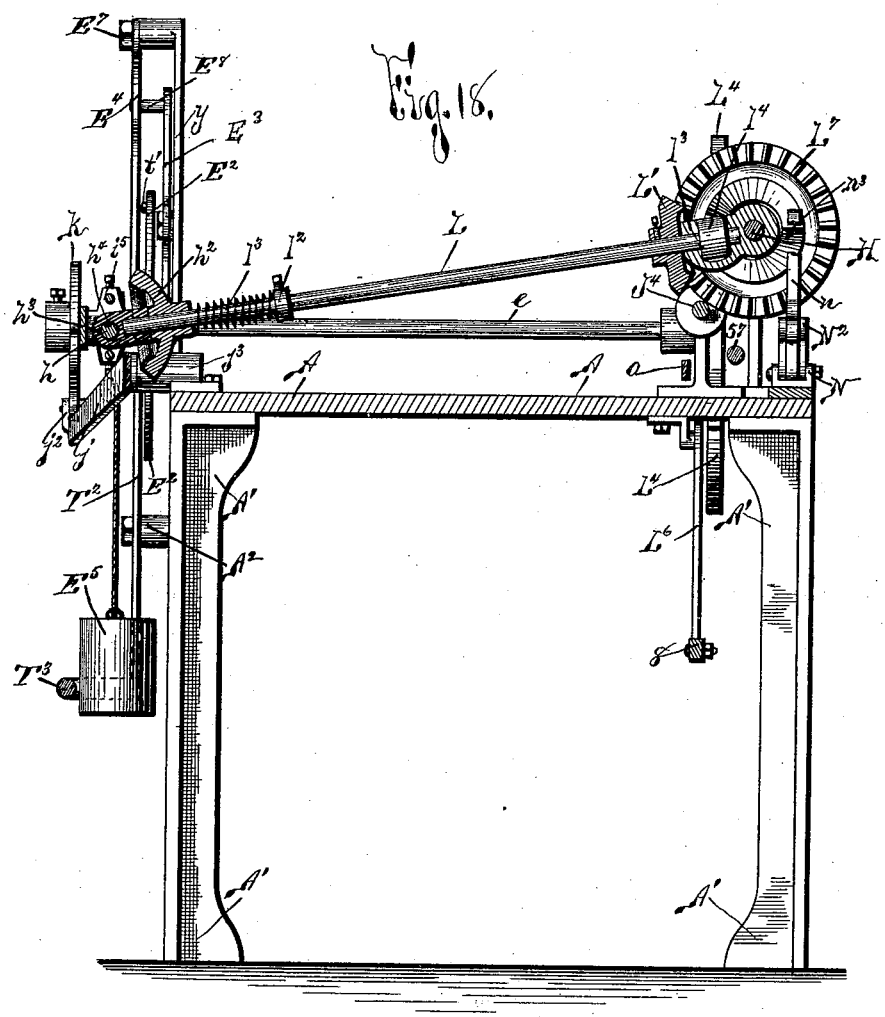

Figure 1 is a top plan view of the preferable construction of our machine for corking a bottle and firmly securing the cork thereto, illustrating the relative construction and arrangement of the parts in this particular construction of our invention. Fig. 2 is a front elevation of the machine, illustrating the same as just on the point of operating upon an inserted bottle. Fig. 3 is an end elevation of our improved machine, still further illustrating the relative construction and arrangement of the parts. Fig. 4 is an enlarged rear elevation of our improved machine, part thereof being shown in section, the supporting-standards and the central portion of the machine being broken away, illustrating the manner of locking the motor-shaft to the various actuating mechanism of the machine, and also the stop for the mechanism for twisting together the separate strands of wire. Fig. 5 is an enlarged vertical section taken through the machine on line $a\,a$, Fig. 1, still further illustrating the mechanism shown in Fig. 4. Fig. 6 is an enlarged section taken on line $b\,b$, Fig. 1, illustrating the manner of moving the wire-carrier toward and away from the bottle, and clearly showing the detail construction and arrangement of the parts. Fig. 7 is a like vertical section, the wire-carrier being shown with its shuttle-jaws encircling the nose of the bottle and the cork just forced between said shuttle-jaws into the bottle. Fig. 8 is an enlarged vertical section taken on line $c\,c$, Fig. 1, illustrating the bottle-carrier and the device for securing together the extremities of the wire projecting therefrom after the wire has been secured to the neck of the bottle. Fig. 9 is an enlarged vertical section taken on the opposite side of the section-line $c\,c$, illustrating the detached device for lifting the projecting extremities of the wire after the same has been secured to the bottle, in order that they may be readily grasped by the wire twisting or securing device illustrated in Fig. 8. Fig. 10 is an enlarged detached inverted plan of two of the lifting-arms illustrated in Fig. 9, shown in the position assumed when they have lifted the ends of the wire. Fig. 11 is an enlarged longitudinal vertical section of the detached compressor and its bracket, the compressor-rod, and the supporting-standard for the compressor-bracket. Fig. 12 is an enlarged elevation of the cut-off, mounted upon a detached portion of the table, shown in full line in its normal position and in dotted lines in the position assumed when cutting off the wire. Fig. 13 is an enlarged vertical section on line $x\,x$, Fig. 1, illustrating the manner of conveying motion to the cut-off and to the bottle-carrier. Fig. 14 is an enlarged horizontal section of the bottle-carrier, taken on line $y\,y$, Fig. 2, illustrating the manner of operating the bottle-carrier arms for holding the bottle. Fig. 15 is an enlarged horizontal section taken on line $z\,z$, Fig. 3, still further illustrating the manner of conveying motion to the bottle-carrier. Fig. 16 is an elevation, partly in section, of the detached mechanism for twisting the extremities of the wire projecting upwardly from the bottle. Fig. 17 is a detached enlarged detail of the shuttle and shuttle-jaws for feeding and securing the wire. Fig. 18 is a transverse section of the machine, taken on line $d\, d$, Fig. 1, illustrating the manner of conveying motion from the motor-shaft to the mechanism for twisting together the separate strands of wire, and the stop device for stopping the twisting of the wire-carrier when the same is in a horizontal position; and Fig. 19 is a detached view of the cut-off actuating-cam and the pivoted curved face contacting with said cam and conveying motion therefrom.

A represents the table of this the preferred construction of a machine embodying our invention, of any desirable form, size, or material, mounted upon any suitable support or standards A', and preferably carrying and supporting, with their actuating and connecting mechanism, the various elements of our invention—viz., a bottle-support B, a bottle-carrier R, a compressor C, a plunger D, a wire-carrier E, a cut-off M, and a wire-securing device P.

H represents the motor-shaft, to which power may be applied either by hand or in any other suitable manner, and from which motion is communicated to the hereinbefore-mentioned parts. The shaft H is journaled in brackets I and $I^3$, mounted upon the table A, and carries a cam J, loosely mounted thereon and provided with a clutch-face $J^2$, adapted to be engaged with a sliding clutch-section $J^3$, as presently described. By means of a connecting-rod J', or other suitable mechanism, the rotation of the cam J operates the compressor C, supported upon a like bracket I, also mounted upon the table A. In order to insure a constant contact of the compressor connecting-rod J' with its actuating-cam J, a spring 1 is attached thereto in any desirable manner, constantly opening the compressor and forcing its connecting-rod J' against the cam J.

As shown in Fig. 11, the compressor consists of a forward jaw $g$ and a rear jaw $g'$, hinged thereto at $g^2$, and hinged to the compressor-rod J' at $g^3$. In the compressor-bracket C' we provide a downwardly-extending slot $C^2$, in which are guided rollers $f$, mounted upon the hinge-pin $g^3$ of the compressor-jaw. As the compressor-rod J' forces the hinged jaw $g'$ toward the opposite jaw $g$, compressing the cork, the rollers $f$ ride in the slot $C^2$, forcing the lower extremity of the compressor downward into close proximity with the nose of the bottle for the purpose of insuring successful operation when inserting the cork.

On the opposite extremity of the motor-shaft H to that journaled in the bracket I, we provide the worm 3, engaging a worm-wheel 2, secured to the cross-shaft $e$, extending at right angles to the motor-shaft H and journaled in suitable brackets preferably mounted upon the table A.

Pivoted to the cross-shaft $e$, by the hub $i'$, is the bracket $i$, with its free extremity $i^2$ guided in a slot $i^3$ in the bracket $i^4$, secured to the table A. The bracket $i$ is provided with a hub $i^5$, interposed between the pivotal hub $i'$ and the extremity $i^2$ and secured at one extremity by set-screws $i^6$ to said hub $i^5$; and at the other extremity to the pivotal hub $i'$, are the guide-rods $i^7$, preferably arranged one above the other. Mounted upon these guide-rods $i^7$ is the cross-head $x$, in which is journaled the extremity of the shaft $h$, on the opposite extremity of which shaft $h$ is mounted the wire-carrier E, secured thereto by a set-screw or other device. It will thus be seen that the wire-carrier has a rectilinear movement by reason of the movement of the cross-head $x$ upon the guide-rods $i^7$.

Provided upon the cross-head $x$ is a roller or stud $x'$, projecting therefrom, which is mounted in a slot $E^6$, provided in one extremity of the lever $E^4$, the opposite extremity of which lever is pivoted at $E^7$ to the support $y$, secured to the table A. Pivoted to said support $y$ is a lever $E^3$, provided at its upper extremity with a projecting stud $E^8$, riding in the slot $E^9$, interposed between the two extremities of the pivoted lever $E^4$. The opposite extremity of the lever $E^3$ carries a roller $e^7$, which by means of a weight $E^5$, secured to the lever $E^4$, is constantly contacted with a cam $E^2$, mounted upon the cross-shaft $e$. The cam $E^2$ is provided with a cut-out 4, and when the roller $e^7$, secured on the lower extremity of the pivoted lever $E^3$, registers with the cut-out 4, the lower extremity of said lever is forced backward into said cut-out by reason of the constant action of the weight $E^5$, secured in front of the lower extremity of the pivoted lever $E^4$ and tending to draw forward the lower extremity of said lever $E^4$. The lower extremity of this lever $E^4$ engages the roller $x'$, provided on the cross-head $x$, secured to the shaft $h$, carrying the wire-carrier E, and it will be seen that this movement of the lever $E^4$ forces the wire-carrier forward or toward the bottle. When by the continued rotation of the shaft $e$ the cam-face 7 forces forward the lower extremity of the pivoted lever $E^3$, the lower extremity of the lever $E^4$ is forced backward against the action of the weight $E^5$ by reason of the backward movement of the upper extremity of the pivoted lever $E^3$, thus retracting the wire-carrier after the same has secured the wire to the bottle in a manner presently explained.

The wire-carrier E, as preferably constructed, consists of a bracket $e'$, pivoted to which are shuttle-jaws $e^3$, to which the wire is fed out. The free end of the pivoted bracket $i$ is supported upon the extremity $j'$ of the lever $j$, pivoted to the bracket $j^3$, secured to the table A. The opposite extremity $j^2$ of the lever $j$ contacts with a cam $k$, mounted upon the cross-shaft $e$. This cam $k$ is so timed with the cam $E^2$ that when the said cam $E^2$ has moved forward the wire-carrier, the cam $k$ forces downward the extremity $j^2$ of the lever $j$ and elevates the opposite extremity $j'$ of said lever, thus allowing the shuttle-jaws $e^3$ to pass over the top of the bottle when the wire-carrier is moved forward.

The wire-carrier E carries a wire-spool $e^2$, having two separate feeding ends of wire, which are preferably wound side by side upon the spool $e^2$ and are passed through the central eye $e^5$ and suitably connected to the extremities $e^4$ of the shuttle-jaws $e$. This peculiar arrangement of the wire gives an equal tension to each strand, which may be increased at will by winding the wire around the shuttle-jaws $e^3$ before passing it through the extremities $e^4$.

When starting our machine for the first time, it is necessary to feed out the separate strands of wire for a short distance beyond the extremities $e^4$ of the shuttle-jaws $e^3$ and twist them together; but this hand-twisting is necessary but once, as thereafter the machine will, as presently described, spin out a sufficient length of wire twisted together that, when the cut-off operates, a length of wire will be left twisted together and extending forwardly from the shuttle-jaws sufficient to be turned up and secured over the top of the cork after the wire has been secured to the bottle. When by the rotation of the shaft $e$, as previously described, the wire-carrier is moved forward, encircling the neck of the bottle, a cam-tooth $l$, secured upon one side of a cam $L^4$, mounted upon the said cross-shaft $e$, contacts with a roller $J^5$, secured at one extremity of the clutch-rod $J^4$, guided in the bracket $l^9$. A clutch-dog $J^6$, hinged to a bracket $a$ and pivoted to the opposite extremity of the clutch-rod $J^4$, forces forward the sliding clutch-section $J^3$, keyed to the shaft H, and locks the said section with the clutch-face of the loose cams J and $D^3$, thus bringing the compressor and plunger into operation immediately after the limit of the forward movement of the shuttle-jaws. By the rotation of the cam J, secured by the clutch-section $J^3$ to the shaft H, the compressor-rod $J'$ is moved forward, compressing the cork and forcing the compressor C in direct proximity to the nose of the bottle, as previously described, and the plunger D drives the cork through the compressor C into the bottle, after which operations the compressor and plunger are retracted to their normal position.

As shown in Fig. 3, the plunger D is mounted above the compressor C in suitable brackets I', supported upon the bracket I, which is secured to the table A and supports the compressor C. The plunger is forced downward through the compressor, inserting the cork, and is retracted to its normal position by means of a rocking lever D', pivoted in a bracket $I^2$, mounted upon the bracket I, secured to the table A.

Secured to the rocking lever D' is the depending connecting-rod $D^2$, and by means of a spring $D^5$, attached in any desirable manner, the connecting-rod $D^2$ is constantly contacted with its actuating-cam $D^3$. As the cam-tooth $D^4$ presses upward the connecting-rod $D^2$, the plunger is forced downward, and is afterward retracted when the tooth $D^4$ has passed the point of contact with the connecting-rod $D^2$. Conjointly with the operations of the compressor and plunger the wire-carrier in its operation of securing the wire is slightly lowered by reason of the extremity $j^2$ of the supporting-lever $j$, registering with a cut-out in the cam $k$, allowing the forward end $j'$ of said lever to be slightly depressed. Immediately upon the lowering of the wire-carrier the cam $E^2$, as previously described, forces outward the lower extremity of the pivoted lever $E^3$ and retracts the wire-carrier, catching the wire beneath the ridge of the bottle-head at the upper extremity of the neck, with the forward twisted ends of the wire projecting outwardly from the bottle. As shown in Fig. 17, the shuttle-jaws $e^3$ are pivoted to the frame or bracket $e'$ and held with their free ends approximately together by means of suitable springs 6, secured thereto in any desirable manner, and when the carrier is retracted by the cam $E^2$ the free ends $e^4$ of the shuttle-jaws ride around the bottle, rocking the shuttle-jaws $e^3$ on their pivots against the tension of the spring 6. During the rearward movement of the wire-carrier E the shaft $h$, carrying the wire-carrier, is rotated by means of gearing connecting said shaft to the motor-shaft H. The gear $h'$ is secured to the shaft $h$ by a feather $h^3$, which, during the rectilinear movement of the shaft, rides in a keyway $h^4$, provided in said shaft. The gear $h'$ meshes with a like gear $h^2$, mounted on the cross-shaft L. The extremity of the cross-shaft L, carrying the gear $h^2$, is pivoted to the shaft $h$ by the L-bracket $h^3$, and has a slight movement in and out of said bracket.

The collar $l^2$ is secured upon the cross-shaft L, back of the gear $h^2$, and between said gear and the collar $l^2$ we interpose a spring $h^6$, constantly forcing the gear $h^2$ forward into engagement with the gear $h'$, and insuring the positive meshing of the gears when the shaft $h$ is depressed. As shown in Fig. 18, the opposite extremity of the shaft L is pivoted to the motor-shaft H by a T-bracket $l^3$ and is secured therein by the collar $l^4$. Secured to this extremity of the cross-shaft L is a gear L', meshing with a like gear $L^7$, loosely mounted upon the shaft H, which gear is provided with a clutch-face adapted to be engaged by the sliding clutch-section $L^2$, secured by a feather or key to the shaft H and sliding thereon. The clutch $L^2$ is operated by a clutch-dog $l^5$, mounted on the sliding rod $L^3$, guided in the bracket $l^9$, secured upon the table A. Provided at the rear extremity of the rod $L^3$ is a roller engaged by the cam $L^4$, which cam is timed with the cam $E^2$, so that the gear $L^7$ is not locked with the shaft H until the shuttle-jaws $e^3$ have been withdrawn clear of the bottle by means of the cam $E^2$. When the wire-carrier has been retracted and a sufficient length of wire has been spun out, the sliding clutch-section $L^2$ is thrown out of engagement with the gear $L^7$ by means of a spring $L^5$, secured to the clutch-rod $L^3$ and adapted to retract the same after the passage of the cam-tooth $L^8$ of the cam L.

From an inspection of the drawings and the foregoing description it will be seen that the cork-inserting plunger and the wire-securing mechanism are operated conjointly, so that while the bottle is being corked the wire is being secured to the bottle with its extremities projecting therefrom, and it will be hereinafter described how that after the conjoint operation of the said mechanism the projecting wire is turned up over the top of the bottle and corked and then secured in such position, thus preventing escapement of the cork.

It is necessary that the rotation of the shaft $h$ shall be so timed as to leave the wire-carrier in its normal position with its jaws in a horizontal plane at the commencement of each forward movement, for the reason that the shuttle-jaws $e^3$ must be in position to embrace or encircle the neck of the bottle; and to secure this position of the wire-carrier at the termination of its rotating movement we provide the following mechanism. (Best shown in Figs. 4 and 5.)

In a bearing N we pivot the lever N', said lever being provided with the forked stud $N^2$, which guides the pawl-lever $n$, which lever is also pivoted to the forked bearing. The lever $n$ is provided with a stud $n'$, which takes in the notch $n^3$ of the gear $L^7$. A spring $n^4$, interposed between the extremity of the forked guide $N^2$ and the pawl-lever $n$, forces the pawl-lever with a constant pressure toward the gear $L^7$. The upper end of the lever N' is provided with a friction-roller riding in the groove $l^8$ of the sliding clutch-section $L^2$, and when said clutch-section is moved forward, locking the gear $L^7$ with the shaft H, the lever N' is rocked, and the shoulder $N^4$, formed in the forked bearing $N^2$ of said lever, bears against the pawl-lever $n$, forcing the pawl $n'$ out of engagement with the notch $n^3$. As the sliding clutch-section is retracted, the spring $n^4$ forces the lever $n$ inward and engages the same with the gear $L^7$, stopping it so that the shuttle-jaws $e^3$ are in a horizontal plane.

In order to make certain of stopping the rotation of the carrier at the right place, we prefer to employ two stopping-points, and consequently two notches $n^3$, in the gear $L^7$ at the right point to stop the carrier in its normal position. After the retraction of the wire-carrier and the stopping of the twisting mechanism the cut-off M is brought into operation, severing the wire secured to the bottle from the wire-carrier, as shown in Fig. 12. The cut-off M preferably consists of two contacting metal plates $m$ $m'$, pivoted together and provided with jaws M', held apart by a spring $M^5$, which jaws M' are normally out of the path of the wire-carrier, and are adapted to be swung over the wire by means of a connecting-rod $M^3$, hinged to the plate $m'$. A suitable stop $m^2$ checks the forward movement of the plate $m$ of the cut-off M, hinged to the bracket $m^4$, secured to the table A, whereupon the plate $m'$, pivoted to the plate $m$ at $m^5$, is rocked forward on the pivot against the action of the spring $M^5$, shearing off the wire.

The connecting-rod $M^3$ of the cut-off is provided at its rear extremity with a curved face $M^4$, (shown in Fig. 19,) which is contacted with a cam U, mounted upon the motor-shaft H and secured thereto. The pivoted face $M^4$ is normally out of the path of the said cam U, and is loosely mounted or pivoted on the clutch-rod $J^4$. Secured to the pivoted face $M^4$ is one extremity of the rod or bar $o$, the opposite extremity of which rod is hinged to the pivoted lever $o'$, having the bent extremity $o^2$, held normally in the path of a stud $t$, projecting from the cam $L^4$. The upper extremity of the lever $o'$ is pivoted at $o^3$ to a bracket $o^4$, secured to the table. The stud $t$ is so placed upon the cam $L^4$ that immediately after the twisting of the wire has ceased the stud engages the curved extremity $o^2$, forcing the same forward, and by means of the connecting-rod $o$ slides the curved face $M^4$ in the path of the cam U, which cam is secured to the shaft and is continually rotated thereby. The cam U rocks the curved face forward, bending or twisting the rod $o$, which is preferably of spring metal, and by means of the connecting-rod $M^3$ swings the cut-off M over the wire and shears off the same, as previously described. After the passage of the stud $t$, a suitable spring $o^5$, secured at one extremity to the curved face $M^4$ and secured at its other extremity to a suitable support $o^6$, mounted upon the table A, retracts the curved face out of the path of the cam U and swings the pivoted lever $o'$ into position, to be again engaged by the stud $t$ upon the rotation of the cam $L^4$. The cut-off is retracted to its normal position by means of the natural spring of the long spring-bar $o$ from its forced position when the cut-off is operated.

As best shown in Figs. 6 and 7, it will be seen that the cut-off is preferably midway between the bottle when being corked and the wire-carrier when in its extreme rearward position away from the bottle. As the wire-cutter is operated as soon as the wire-carrier is in this rearward position, it will be seen that extending from the extremities $a^4$ of the shuttle-jaws there is a length of wire twisted together equal to the distance between said extremities and the wire-cutter. This length of wire is sufficiently long to extend beyond the top of the cork after the same is driven into the bottle, and also to be twisted with the opposite extremities of the wire secured above the cork, by the mechanism as presently described.

Instead of placing the bottles separately by hand upon the support B, we preferably use a feed or carrier R, adapted to contain several bottles, which are continuously fed to their position in the carrier either by the aid of an attendant or by a special feeding device. (Not shown.) As preferably constructed, and shown in Figs. 8 and 14, the bottle feed or carrier R is loosely mounted upon a stationary rod V, supported in suitable brackets V' by setscrews or other means, and is turned upon this rod V by the mechanism illustrated in Figs. 13 and 15.

The stud $t$, projecting from the cam $L^4$, which, as previously described, operates the cut-off, contacts with a lever $L^6$, pivoted to the bracket $a^5$ secured upon the table A, to which lever is secured the connecting-rod 8, pivoted to one arm of the bell-crank 9 mounted on the depending bracket $a^4$, to the opposite arm of which crank is secured the connecting-rod 10. The extremity of the rod 10 is provided with stops 51, interposed between which is the bracket 52, pivoted to the collar 11, mounted on the rod V. As the stud $t$ rocks the pivoted lever $L^6$, the rear collar or stop 51 engages the rear face of the pivoted bracket 52, and forces the loose collar 11 partly around the shaft V, from which position the said collar is retracted by means of a suitable spring 12, secured to the lever $L^6$.

The collar 11 is imposed upon the top face of a disk 14, both loosely mounted upon the shaft V, and is actuated in an annular recess in said top face of the disk 14. When the collar 11 is partly rotated around the rod V, a dog 13, pivoted to said collar, engages a notch 53 in the top face of the disk 14, forcing the same partly around with the collar 11. The disk is then locked by a rod 15, forced normally by a spring 16 into a socket 17, provided in said disk.

It will be noted that when the cam $L^4$ is rotated, and by the stud $t$ operates the lever $L^6$, the disk 14 is actuated a certain given distance, and that the same rod 10 which actuates the disk 14 by means of the collar 11 is provided with a collar 18, secured thereto, which engages the pivoted lever 19, connected to the lock 15, and forces it out of the notch 17.

By reference to Fig. 15 it will be seen that the space between the collars 51, secured to the rod 10, is considerably greater than the length of the hinged bracket 52, in order to allow the retraction of the lock 15 by the collar 18 and pivoted lever 19 before the engagement of the said pivoted bracket 52 by the rear collar 51, for the purpose of operating the collar 11.

Loosely mounted on the rod V is the disk 22, preferably provided with a clutch-face, which engages a like clutch-face provided upon the disk 14, as shown in Figs. 2 and 8. Connected to the disk 22 by straps 50 is a like disk 22, also loosely mounted upon the rod V. Interposed between these disks 22, and pivoted thereto by pins 23, are the pivoted arms 20, arranged in pairs at intervals corresponding to the distance said disk is operated by the rod 10. These arms 20 are substantially right angular in form, with the rock-arms 24 of each pair of arms projecting toward each other and hinged together at their free extremities, with the extension 21 projecting at right angles to the arms 24 and adapted to readily engage and retain the bottle. These bottle-carrier arms 20 are normally opened by means of springs 25, connected thereto, and are automatically closed around the inserted bottle by means of cams 26, bearing upon the hinged extremities of each pair of the rock-arms 24, forcing them inward and tightly impinging the projecting extensions 21 against the bottle. The cams 26 are provided with a projecting lug or arm 27, having mounted thereon a roller 28, bearing upon the cam 29, secured by a set-screw or other means to the stationary rod V. As the bottle-carrier R is rotated by means of the rod 10, the rollers 28 are forced around the cam 29, and, contacting with its cam-face 30, are forced outward, forcing the cams 26 inward, swinging inward the rock-arms 24, and impinging upon the inserted bottle by the extending arms 21. When the operations upon the bottle have been completed, the rollers 28 register with a cut-out 31 in the cam 29, whereupon the carrier-arms are withdrawn from around the bottle by the action of the springs 25, secured to the adjacent carrier-arms of each pair, and the bottle is dropped into any suitable receptacle. Upon the operation of the cut-off M the projecting extremities of the twisted strands of the wire extending from the bottle are turned upward by lifters O, mounted in pairs above the bottle-carrier arms in slots O', provided in the disk $O^2$, connected by the straps 50 to the disks 22 of the bottle-carrier R.

The lifters O, as illustrated in Figs. 8 and 9, are normally below the nose of the bottle, to allow the wire to be readily attached thereto, and are raised upward, carrying with them the projecting ends of the wires by means of a cam Q, secured by a set-screw or other means to the stationary rod V. The inner ends of each pair of lifting-arms O are cranked toward each other, and are provided with a pin $O^3$, bearing upon the cranked extremities $O^4$, and are supported in their normal position by a spring $O^7$. The pin $O^3$, bearing upon the cranked extremities of the lifter-arms O, projects through the top of the disk $O^2$ into an annular recess in the bottom face of the collar $O^6$, secured to the stationary rod V. As by means of the strap 50, secured to the disk $O^2$, the said disk is rotated by the rotation of the bottle-carrier, the pin $O^3$ is actuated around the face of the recess, and contacts with the projection or cam $O^5$ of said collar $O^6$, forcing the pin downward and rocking downward the cranked extremities of the lifter-arms and rocking upward the wire-engaging extremities of said lifter-arms. After the operation of the lifters O the wire-securing device illustrated in Figs. 8 and 16 grasps the separate upwardly-extending extremities of the twisted strands of wire with the oscillating twisting arms or nippers P. These oscillating twisting arms or nippers P are pivoted in the double-flanged hub 37 in the slot 54, provided therein, with their lower extremities normally opened to close over the wire and their upper extremities P' pivoted to levers P², which are normally forced upward by means of springs P³. Interposed between the flanges of the collar 37 is the hub $z$ of the supporting-bracket Z, secured to the table A.

Projecting upwardly from the collar or hub 37 is the threaded spindle 36, mounted upon which spindle is the collar 30, connected by straps 31 to one extremity of the lever 32, pivoted in the projection $z'$ of the bracket Z. The lever 32 is connected at its opposite extremity to a rod 33, pivoted thereto at one extremity and pivoted at the other extremity off the center of a gear 35, journaled in a bracket $z^2$, secured upon the table. The gear 35 is engaged by a like gear 36, loosely mounted on the motor-shaft H, and provided on its hub with a clutch-face adapted to be engaged by a sliding clutch-section 56, having a like clutch-face. The sliding clutch-section 56 is secured to the shaft H by a spline or feather, and has a rectilinear movement thereon by means of the clutch-dog 59, hinged to a bracket 60, secured to the table and pivoted to the clutch-rod 57, the opposite extremity of which rod is provided with a roller 58, engaged by the projection 61 on one side of the cam $L^4$, which projection is of sufficient length to engage the clutch 56 with the gear 55 until the operation of twisting together the upwardly-projecting extremities of the wire has been completed. When the cam-tooth 61 of the cam $L^4$ has locked the gear 55 with the shaft H and the pivoted lever 32 has forced the collar 30 down the spindle 36, the lower face of the collar contacts with the levers P², forcing them into the position illustrated in Fig. 16, into a horizontal plane with the lower extremities of the twisting arms or nippers, closely impinging the interposed wire, thus securely locking the twisting-arms in said position against the action of the springs P³, tending constantly to force them outward. By the continued rotation of the gear 55 the collar 30 is elevated, and a suitable nut W, mounted above said collar on the spindle 36, is automatically locked to said collar by means of depending projections or teeth $w$ on the lower face thereof engaging sockets or recesses in the top face of the collar 30.

The nut W is provided with a projecting point or points 38, riding in the thread 39 of the spindle 36, and as the collar is elevated the nut W will also be elevated; but as the said nut is securely locked by the projections $w$ to the hub 30 it will be seen that the said nut cannot turn around the spindle, and the spindle 36 will be forced around, causing the hub 37 to rotate in the hub $z$ of the bracket Z and rotating the twisting arms or nippers.

The spindle 36 is provided with the rod 40, sliding rectilinearly in a longitudinal opening in said spindle. On the lower extremity of the rod 40 is a cross-bar 41, normally beneath the plane of the locked position of the pivoted levers P², and at the upper extremity we provide a washer 42, which is engaged by the nut W on the upward movement of the collar 30, thus contacting the cross-bar 41 with the levers P², slightly raising them out of their locked position, and allowing the springs P³ to force them open to the position illustrated by full lines in Fig. 8 and dotted lines in Fig. 16.

It will be seen that when the collar 30 is forced downward the nut W is automatically disengaged therefrom and falls by gravity down the spindle 36 without turning the same, which would happen if the nut W were locked to the collar 30 in its descent. The distance between the twisting arms or nippers and the compressor is equal to the distance between the bottles in the feed or carrier, and as the same is rotated, feeding an uncorked bottle over the bottle-support and beneath the compressor, the bottle previously corked and provided with the wire secured thereto, with its ends projecting, is rotated beneath said twisting mechanism, thus making the operation of the machine continuous.

In a corking-machine it is necessary that the noses of the bottles should always be in the same plane at an equal distance from the compressor, as the action of the compressor is positive, and from the fact that the bottles vary considerably in size the compressor would necessarily break or fracture a bottle extending upwardly beyond the desired distance, which would happen if the bottle-support B were fixed. Accordingly in feeding bottles into the bottle feed or carrier we contact their top or nose with a fixed support S serving as a gage, whereupon they are tightly grasped by the bottle feed or carrier R in the desired position.

As seen in Fig. 8, directly beneath the bottle-gage S is the bracket S', secured to the shaft V, carrying a sliding rod S², having a support S³ at its upper extremity. Interposed between said support S³ and the bracket S' is the spring S⁴, constantly forcing said support upward. This support S³ is readily depressed when a bottle is inserted between the carrier-arms and contacted with the stop-gage S, and the spring S⁴ forces the top of the bottle into contact with said gage. When by the operation or rotation of the feed or carrier the bottle has been moved over its support B, beneath the compressor C, which support B, as preferably constructed, is adjustable, the support is raised to the bottom of the bottle before the operation of the plunger in inserting the cork. Just before the bottle is shifted above the support B the same is slightly lowered by a rack T, engaging a gear T', secured upon the shaft of the bottle-support. This movement is effected by means of a stud or roller $t'$, secured upon the cam $E^2$, and suitably timed in relation to the other cams, engaging a pivoted lever $T^2$, pivoted to the standard A' at $A^2$, and connected to the rack T. After the stud $t'$ has been sufficiently rotated to pass out of contact with the pivoted lever $T^2$ and the support B has been lowered a short distance to adapt the machine to bottles of various heights, the pivoted lever $T^2$ is retracted by means of a spring $T^3$, thus elevating the bottle-support B, and when the same strikes the bottom of the bottle the upward movement is readily checked, as the motor force of this movement is simply a spring. By means of this bottle-support it will be seen that there is no liability of the bottle being forced out of engagement with the bottle-carrier arms, since the support B is in a direct line with the movement of the plunger.

It will be understood that the above-described automatic adjustable support might be very readily used with the ordinary corking-machine instead of our improved machine, as hereinbefore described.

Power is applied to the motor-shaft by a continuously-revolving pulley H', which, when it is desired to stop the machine, is readily thrown out of engagement by means of a suitable clutch $H^2$, normally locking the pulley to the shaft H.

It will be particularly noted that the foregoing is a description of this the preferred example of our invention; and our invention includes, broadly, a compressor, a plunger, a wire-carrier, the twisting mechanism, a bottle-support, and a bottle feed or carrier without respect to their specific construction or their manner of operation.

The operation of our invention will be readily perceived from the foregoing, and it will be observed that when a bottle is placed in the feed or carrier the wire-carrier is actuated over the bottle, a cork is simultaneously compressed to the desired form and size in the compressor and inserted into the bottle by the plunger, the compressor and plunger are then retracted and the wire-carrier withdrawn from around the bottle, spinning out the wire, the cut-off is operated to sever the wire, the projecting extremities thereof are then turned upward by the lifters and grasped by the twisting-arms, which are locked in their position, impinging the wire, and are then rotated around the wire, twisting the separate extremities together over the top of the cork, all of which operations are automatic after the bottle has been placed in the machine.

Having thus fully described our invention, what we claim as new, and desire to secure by Letters Patent, is—

1. The herein-described bottle-wiring machine having the following mechanisms, to wit: for securing strands of wire to the bottle, for turning the wire over the top of the bottle and the inserted cork, and for securing the wire in said position, and connected mechanism for operating the foregoing in due order, substantially as described.

2. The herein-described bottle-wiring machine having the following mechanisms, to wit: for securing strands of wire to the bottle, for turning their opposite extremities upward, and for then twisting them together over the top of the bottle and the inserted cork, and connected mechanism for operating the foregoing in due order, substantially as described.

3. The combination of the following mechanisms, to wit: for securing strands of wire to the bottle, for inserting a cork into the bottle, for turning the wire over the top of the bottle and the inserted cork, and for securing the wire in said position, and connected mechanism for operating the foregoing parts conjointly in due order, substantially as specified.

4. The herein-described bottle-wiring machine having the following mechanisms, to wit: for applying separate strands of wire to the bottle, for twisting together the extremities of the separate strands, for turning the twisted extremities over the top of the bottle and the inserted cork, and for then twisting together the twisted opposite extremities of the separate strands, and connected mechanism for operating the foregoing in due order, substantially as described.

5. The combination of a bottle-support with a cork inserter, means for securing the wire to the bottle and over the cork, said means being arranged to operate conjointly with the cork-inserter, and connected mechanism for actuating the wire-securing means and cork-inserter in due order, substantially as and for the purpose set forth.

6. The combination of a cork-inserter for inserting the cork, mechanism for securing the wire to the bottle, and connected mechanism between the parts for actuating the cork-inserter to insert the cork into the bottle during the operation of the wire-securing mechanism in securing the wire to said bottle, substantially as and for the purpose set forth.

7. The combination of a bottle-support for holding the bottle, a cork-inserter having a movement toward and away from the supported bottle, wire-securing mechanism having a movement toward and away from said supported bottle, and connected mechanism for conjointly operating the cork-inserter and wire-securing mechanism, substantially as and for the purpose set forth.

8. The combination of a bottle-support, a cork-inserter for inserting the cork, mechanism for actuating the cork-inserter toward and away from the supported bottle, mechanism for securing the wire to the bottle, with the extremities projecting therefrom, mechanism for actuating the wire-securing devices toward and away from the supported bottle, and connected mechanism for conjointly operating the cork-inserter and wire-securing mechanism, substantially as and for the purpose set forth.

9. The combination of a bottle-support, means for securing the wire to the bottle, a cork-inserter for inserting the cork, mechanism for passing the wire over the top of the bottle and the inserted cork, mechanism for securing the wire in said position, a feed or carrier for feeding the bottle from the cork-inserter and the mechanism for securing the wire to the bottle, the mechanism for securing the wire over the top of the cork, and connected mechanism for operating the parts in due order, substantially as and for the purpose described.

10. The combination of mechanism for securing the wire to the bottle, with its ends projecting therefrom, said mechanism being actuated to encircle the bottle, mechanism for passing the wire over the top of the bottle and the inserted cork, mechanism for securing the opposite extremities of the wire together, and connected mechanism for operating the foregoing in due order, substantially as and for the purpose set forth.

11. The combination of wire-securing jaws or arms for securing the wire to the bottle, with the opposite extremities projecting therefrom, a cork-inserter for forcing the cork between said arms, mechanism for turning the wire over the top of the bottle and cork, mechanism for securing the wire in said position, and connected mechanism for operating said parts in due order, substantially as and for the purpose specified.

12. The combination of the compressor for compressing the cork, means for holding the compressor normally open to receive the cork, with the following mechanisms, to wit: for securing the wire to the bottle, with its extremities projecting therefrom, for inserting the cork into the bottle, for passing the extremities of the wire over the top of the bottle and the inserted cork, and for securing the extremities in said position, and connected mechanism between the several parts for operating them in due order, substantially as and for the purpose specified.

13. The combination of wire-securing mechanism for securing the wire to the bottle, with its extremities projecting therefrom, a reciprocating compressor timed with the wire-securing mechanism, and a cork-inserter, with the following mechanisms, to wit: for passing the wire over the top of the bottle and the inserted cork, for securing the wire in said position, and connected mechanism for operating the foregoing parts conjointly in due order, substantially as described.

14. The combination of reciprocating wire-securing mechanism for securing the wire to the bottle, with the extremities projecting therefrom, a reciprocating compressor timed with the reciprocating wire-securing mechanism, and a cork-inserter, with the following mechanisms, to wit: for passing the wire over the top of the bottle and the inserted cork and for securing the wire in said position, and connected mechanism for operating the foregoing in due order, substantially as and for the purpose specified.

15. The combination of a compressor for compressing the cork, reciprocating jaws for securing the wire to the bottle, with the opposite extremities projecting therefrom, and a cork-inserter for inserting the cork, with the following mechanisms, to wit: for passing the wire over the top of the bottle and the inserted cork, for securing the wire in said position, and connected mechanism for operating the foregoing in due order, substantially as and for the purpose set forth.

16. The combination of a wire-carrier having a movement toward and away from the bottle, oscillating jaws mounted on the wire-carrier for securing the wire around the bottle, with the opposite extremities projecting therefrom, mechanism for passing the wire over the top of the cork, mechanism for securing the wire in said position, and connected mechanism for operating the foregoing parts in due order, substantially as and for the purpose set forth.

17. The combination of yielding jaws encircling the bottle for securing the wire thereto, with its extremities projecting therefrom, mechanism for withdrawing the yielding jaws around the bottle, with the following mechanisms, to wit: for turning the extremities of the wire over the top of the bottle and cork, for securing the wire in said position, and connected mechanism for operating the foregoing in due order, substantially as and for the purpose described.

18. In a wiring-machine, the combination of the following mechanisms, to wit: for securing the wire to the bottle, with the extremities of the wire projecting therefrom, for actuating said wire-securing device lengthwise of the bottle, for passing the wire over the top of the bottle, and for securing the wire in said position, and mechanism operatively connecting the foregoing parts, substantially as specified.

19. The combination of a bottle-support for the bottle, a cork-inserter having a movement toward and away from the supported bottle, wire-securing mechanism having a movement toward and away from the said supported bottle, and also having a movement lengthwise of the bottle, and connected mechanism for actuating the cork-inserter, and wire-securing mechanism to operate conjointly upon said bottle, substantially as and for the purpose set forth.

20. In a wiring-machine, the combination of a bottle-support for the bottle, mechanism for securing the wire to the bottle, with the extremities projecting therefrom, said mechanism having a movement toward and away from the bottle, and also a movement lengthwise of the same, mechanism for turning the projecting extremities over the top of the bottle and the inserted cork, mechanism for securing the wire in said position, and connected mechanism between the parts for operating the same in due order, substantially as and for the purpose specified.

21. In a wiring-machine, the combination of yielding reciprocating jaws or arms for securing the wire to the bottle, with the opposite extremities projecting therefrom, mechanism for actuating said jaws lengthwise of the bottle, mechanism for passing the wire over the top of the bottle and the inserted cork, mechanism for securing the wire in said position, and connected mechanism between the parts, substantially as and for the purpose specified.

22. The combination, in a wiring-machine having the following mechanisms, to wit: for applying the separate strands of wire to the bottle, with their extremities projecting therefrom, for twisting together these projecting extremities and for automatically withdrawing the wire-twisting mechanism, for turning the twisted projecting extremities over the top of the bottle and cork and for securing the wire in said position, and connected mechanism for operating the foregoing in due order, substantially as and for the purpose set forth.

23. The herein-described wiring-machine having the following mechanisms, to wit: for securing separate strands of wire to the bottle, with their extremities projecting therefrom, for twisting together these projecting extremities, for automatically withdrawing the wire-twisting mechanism, for turning the twisted projecting extremities over the top of the bottle and cork, and for twisting together these twisted extremities in said position, and mechanism operatively connected to the foregoing parts, substantially as and for the purpose set forth.

24. In a wiring-machine, the combination of shuttle jaws or arms for applying the separate strands of wire to the bottle, means for rotating the shuttle jaws or arms to twist the said strands together, mechanism for turning the twisted extremities over the top of the bottle and the inserted cork, mechanism for securing the wire in said position, and connected mechanism between the parts, substantially as and for the purpose specified.

25. In a wiring-machine, the combination of a wire-carrier having a movement toward and away from the bottle for applying the wire to the bottle, with the extremities projecting therefrom, arms secured to the carrier encircling the bottle on the forward movement of the carrier and forced around the bottle by the retraction of the carrier, means for rotating the arms when withdrawn clear of the bottle, said rotating means adapted to cease operation when the rearward movement of the carrier is reached, with mechanism for turning the opposite extremities of the wire over the top of the bottle and cork, mechanism for securing the wire in said position, and connected mechanism between the parts, substantially as and for the purpose specified.

26. The combination of an adjustable bottle-support with the following mechanisms, to wit: for securing the wire to the bottle, with its extremities projecting therefrom, for passing the wire over the top of the bottle and the inserted cork, and for securing the wire in said position, and connected mechanism between the parts, substantially as and for the purpose set forth.

27. The combination, with the following mechanisms, to wit: for securing the wire to the bottle, with its extremities projecting therefrom, for passing the wire over the top of the bottle and the inserted cork, and for securing the wire in said position, of an adjustable bottle-support and means for retaining the bottle-support in its adjusted position, substantially as and for the purpose set forth.

28. The combination of an adjustable bottle-support with a cork-inserter having a movement toward and away from said support, wire-securing mechanism having a movement toward and away from said support, and connected mechanism for conjointly operating the foregoing parts, substantially as and for the purpose set forth.

29. In a wiring-machine, the combination, with means for securing the wire to the bottle, of a bottle-support, a feed or carrier for feeding the bottle to the support, mechanism for lowering the bottle-support before a new bottle is fed thereto, mechanism for raising the support to contact with the bottle, and connected mechanism for operating the foregoing in due order, substantially as and for the purpose set forth.

30. The combination of an adjustable bottle-support and a feed or carrier for feeding the bottles to said support, of a cork-inserter having a movement toward and away from the bottle-support, wire-securing mechanism having a movement toward and away from the bottle, and connected mechanism between the parts for operating them conjointly in due order, substantially as and for the purpose set forth.

31. The combination, in a wiring-machine, of wire-securing mechanism for securing the wire to the bottle and over the top of the inserted cork with a bottle-support for holding the bottle, a rotary shank provided on the bottle-support, mechanism for turning said shank and raising or lowering the bottle-support, and connected mechanism between the parts, substantially as and for the purpose set forth.

32. The combination of a bottle-support for the bottles, a rotary shank provided on the bottle-support, and connected mechanism for automatically turning said shank and raising or lowering the bottle-support, substantially as and for the purpose set forth.

33. The combination of a compressor for compressing the cork, said compressor having a movement toward and away from the bottle, a cork-inserter, a bottle-support for the bottle, means for adjusting the bottle-support to suit different heights of bottles, means for retaining the support in its adjusted position, mechanism for securing the wire to the bottle, with its extremities projecting, mechanism for passing the wire over the top of the bottle and the inserted cork, mechanism for securing the wire in said position, and connected mechanism between the parts for operating them in due order, substantially as and for the purpose set forth.

34. The combination, in a wiring-machine, of mechanism for securing the separate strands of wire around the bottle, mechanism for twisting together the projecting extremities of said strands, with a cut-off for severing the wire secured to the bottle from the wire-twisting mechanism, mechanism for turning the opposite extremities of the wire over the top of the bottle and the inserted cork, mechanism for securing the wire in said position, and connected mechanism for operating the foregoing in due order, substantially as and for the purpose set forth.

35. The combination, in a wiring-machine, of wire-securing means having a movement toward and away from the bottle, a cut-off for cutting off the wire at the end of the rearward movement of the wire-securing means, mechanism for turning the extremities of the wire over the top of the bottle and the inserted cork, mechanism for securing the wire in said position, and mechanism for operating the aforesaid parts in due order, substantially as and for the purpose set forth.

36. The combination, in a wiring-machine, of wire-securing mechanism having a movement toward and away from the bottle, means for turning the wire-securing mechanism and thus twisting the wires, a cut-off for cutting off the wire at a point substantially midway between the bottle and the wire-securing mechanism when in its retracted position, mechanism for turning the extremities of the wire over the top of the bottle, mechanism for securing the wire in said position, and connected mechanism for operating the foregoing in due order, substantially as and for the purpose specified.

37. The combination of a rotary bottle-carrier, a cork-inserter, means for securing the wire to the bottle and over the cork, said means being arranged to operate conjointly with the cork-inserter, and connected mechanism for operating the foregoing in due order, substantially as and for the purpose specified.

38. The combination of a bottle-support for the bottles, a cork-inserter having a movement toward and away from the support, wire-securing mechanism having a movement toward and away from the said support, a feed or carrier for feeding the bottles over said support, and connected mechanism for operating the foregoing in due order, substantially as and for the purpose specified.

39. In a wiring-machine, the combination of wire-securing mechanism for securing the wire to the bottle, with the extremities projecting therefrom, mechanism for twisting the wire over the top of the bottle and cork, a bottle feed or carrier for feeding the bottles to the wire-securing mechanism, and then to the device for twisting together the opposite extremities of the wire, and connected mechanism between the parts for operating them in due order, substantially as and for the purpose specified.

40. The combination of the cork-inserter, means for securing the wire around the bottle, with its extremities projecting therefrom, mechanism for turning the said extremities over the top of the bottle and cork, and mechanism for twisting said extremities together, with a bottle feed or carrier having bearings for the bottles arranged at intervals corresponding to the relative distance between the cork-inserter and the device for twisting together the extremities of the wire, and connected mechanism between the parts for operating them in due order, substantially as and for the purpose set forth.

41. The combination of a bottle feed or carrier having pivoted arms for grasping the bottle and the following mechanisms, to wit: for securing strands of wire to the bottle, with their extremities projecting therefrom, for passing the wire over the top of the bottle and the inserted cork, and for securing the wire in said position, and connected mechanism between the parts, substantially as and for the purpose set forth.

42. The combination of the cork-inserter and means for securing the wire to the bottle and over the top of the cork, said wire-securing means being arranged to operate conjointly with the cork-inserter, with a bottle feed or carrier having oscillating arms for grasping the bottle and feeding it to said mechanism, and mechanism for operatively connecting the aforesaid parts and actuating them in due order, substantially as and for the purpose specified.

43. In a wiring-machine, the combination of a bottle-support for the bottles, wire-securing mechanism for securing the wire to the bottle, with the extremities projecting therefrom, mechanism for turning the wire over the top of the bottle and the inserted cork, mechanism for securing the wire in said position, a carrier for feeding the bottles, means for discharging the bottles, and connected mechanism for operating the parts in due order, substantially as and for the purpose set forth.

44. The combination of a bottle support for the bottles, a cork-inserter having a movement toward and away from said support, wire-securing mechanism having a movement toward and away from the said support, a feed or carrier feeding the bottles over the support, mechanism for discharging the bottles from the carrier, and connected mechanism between the foregoing for operating them in due order, substantially as and for the purpose set forth.

45. The combination of the cork-inserter, mechanism for securing the wire to the bottle and over the top of the cork, said mechanism being arranged to operate conjointly with the cork-inserter, with a bottle feed or carrier, arms provided on the carrier and held normally open to receive the bottles, and connected mechanism between the parts for operating them in due order, substantially as specified.

46. The combination, in a wiring-machine, of mechanism for securing the wire around the bottle, with its extremities projecting therefrom, a bottle feed or carrier for feeding the bottles, oscillating lifting-arms for elevating the opposite extremities of the wire secured to the bottle, mechanism for twisting together these extremities, and connected mechanism for operating the foregoing in due order, substantially as and for the purpose specified.

47. The combination, in a wiring-machine, of mechanism for securing the wire to the bottle, with the extremities projecting therefrom, a rotary bottle feed or carrier for feeding the bottles, mechanism for turning the extremities of the wire upward over the top of the bottle and the inserted cork, and connected mechanism between the parts, substantially as and for the purpose specified.

48. The combination of a stop or gage for forcing the bottles to the desired plane, of the following wire-securing mechanisms, to wit: for securing strands of wire to the bottle, for passing the wire over the top of the bottle and the cork, and for securing the wire in said position, and connected mechanisms between the parts, substantially as and for the purpose set forth.

49. The combination of a support for the bottles, a cork-inserter having a movement toward and away from the support, wire-securing mechanism having a movement toward and away from said support, a stop or gage for bringing the bottles into the required plane, and connected mechanism between the parts, substantially as and for the purpose set forth.

50. The combination of a support for the bottle, a cork-inserter having a movement toward and away from the support, wire-securing mechanism having a movement toward and away from said support, a feed or carrier for feeding the bottles over the said support, a stop or gage for forcing the bottles down to the desired position in said carrier, and mechanism for operatively connecting the aforesaid parts, substantially as described.

51. The combination, in a wiring-machine, of a support for the bottle, wire-securing mechanism for securing the wire to the bottle, said wire-securing mechanism being arranged to operate conjointly with the cork-inserter and over the top of the cork, with a bottle feed or carrier for feeding the bottles, oscillating arms mounted on the carrier, a stop or gage for contacting with the bottle, mechanism for impinging the oscillating jaws against the bottle, and connected mechanism for operating the foregoing parts in due order, substantially as and for the purpose set forth.

52. The combination of a cork-inserter for inserting the cork, a spool having two separate feeding-strands wound thereon, and mechanism for feeding out the wire, with the following mechanisms: for securing the wire to the bottle, with its extremities projecting therefrom, for passing the wire over the top of the bottle and the inserted cork, for securing the wire in said position, and connected mechanisms for operating the foregoing parts in due order, substantially as and for the purpose set forth.

53. The combination of mechanism for securing the wire around the bottle, with its extremities projecting therefrom, oscillating arms for acting on said extremities of the wire, mechanism for locking and rotating the oscillating arms, and connected mechanism for operating the said working parts, substantially as and for the purpose set forth.

54. The combination, in a wiring-machine, of mechanism for securing the wire around the bottle, with its extremities projecting therefrom, with means for elevating the projecting extremities of the wire, oscillating arms or nippers for twisting together these projecting extremities over the top of the cork, a bottle feed or carrier for feeding the bottles, mechanism for actuating the wire-twisting arms or nippers toward and away from the bottle feed or carrier, and connected mechanism between the parts for operating the same in due order, substantially as and for the purpose set forth.

55. The combination, in a wiring-machine, of mechanism for securing the wire to the bottle, with its extremities projecting therefrom, means for elevating these projecting extremities of the wire, oscillating arms or nippers for twisting together the projecting extremities of the wire, mechanism for locking these arms or nippers upon the wire, mechanism for unlocking these arms, and connected mechanism between the parts for operating them in due order, substantially as and for the purpose set forth.

In testimony whereof we have hereunto signed our names, in the presence of two attesting witnesses, at Syracuse, in the county of Onondaga, in the State of New York, this 15th day of November, 1888.

HENRY LA CASSE.
SOL. WILE.

Witnesses:
  A. E. PARSONS,
  CLARK H. NORTON.